(12) United States Patent
Shepard et al.

(10) Patent No.: US 11,695,738 B2
(45) Date of Patent: *Jul. 4, 2023

(54) UNIFIED COMMUNICATION GATEWAY SYSTEMS

(71) Applicant: SIERRA NEVADA CORPORATION, Sparks, NV (US)

(72) Inventors: Kyle Andrew Shepard, Highlands Ranch, CO (US); Kevin Jeffrey Streander, Castle Rock, CO (US); Peter Fischer, Highlands Ranch, CO (US)

(73) Assignee: Sierra Nevada Corporation, Sparks, NV (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/200,613

(22) Filed: Mar. 12, 2021

(65) Prior Publication Data

US 2021/0203637 A1 Jul. 1, 2021

Related U.S. Application Data (63) Continuation of application No. 16/422,625, filed on May 24, 2019, now Pat. No. 10,979,399.

(51) Int. Cl.
*H04L 9/40* (2022.01)
*G06F 16/245* (2019.01)

(52) U.S. Cl.
CPC .......... *H04L 63/029* (2013.01); *G06F 16/245* (2019.01); *H04L 63/123* (2013.01)

(58) Field of Classification Search
CPC ... H04L 63/029; H04L 63/123; H04L 9/3239; H04L 9/50; G06F 16/245
See application file for complete search history.

(56) References Cited

U.S. PATENT DOCUMENTS

| 7,606,235 B1 | 10/2009 | Ayyangar et al. |
| 9,794,289 B1 * | 10/2017 | Banerjee ................. H04L 63/20 |
| 2005/0141706 A1 | 6/2005 | Regli et al. |

(Continued)

FOREIGN PATENT DOCUMENTS

| JP | 2005509381 | 4/2005 |
| JP | 2008508837 | 3/2008 |
| WO | WO01/05098 | 1/2001 |

OTHER PUBLICATIONS

International Search Report on corresponding PCT application (PCT/US2020/031514) from International Searching Authority (USPTO) dated Jul. 20, 2020.

(Continued)

*Primary Examiner* — Mohammad W Reza
(74) *Attorney, Agent, or Firm* — Mintz, Levin, Cohn, Ferris, Glovsky and Popeo, P.C.

(57) ABSTRACT

A communication system utilizing unified gateways bridges communication gaps between data transmitters having differing transmission, security, data format, overhead restrictions and performance metrics by dynamically determining optimal data paths for the data being routed. The unified gateways can also dynamically alter data packages to upgrade/downgrade security standards, alter transmission networks, translate data to match recipient requirements and split/combine data to optimize data throughput using disparate systems.

18 Claims, 6 Drawing Sheets

(56) References Cited

U.S. PATENT DOCUMENTS

| | | |
|---|---|---|
| 2007/0036109 A1 | 2/2007 | Kwak et al. |
| 2009/0182859 A1 | 7/2009 | Motoyama |
| 2009/0287837 A1 | 11/2009 | Felsher |
| 2012/0014282 A1 | 1/2012 | Pappu et al. |
| 2012/0166582 A1 | 6/2012 | Binder |
| 2013/0166387 A1 | 6/2013 | Hoffberg |
| 2014/0044132 A1 | 2/2014 | Chase et al. |
| 2014/0283030 A1* | 9/2014 | Moore .................. H04L 47/11 726/22 |
| 2015/0264626 A1 | 9/2015 | Perdomo |
| 2016/0365897 A1 | 12/2016 | Gross et al. |
| 2017/0251515 A1 | 8/2017 | Altman et al. |
| 2019/0121350 A1 | 4/2019 | Celia et al. |
| 2019/0159223 A1 | 5/2019 | Park et al. |
| 2019/0327112 A1* | 10/2019 | Nandoori ............. H04L 47/125 |
| 2020/0137121 A1* | 4/2020 | Rogers ............... H04L 63/0209 |

OTHER PUBLICATIONS

Written Opinion on corresponding PCT application (PCT/US2020/031514) from International Searching Authority (USPTO) dated Jul. 20, 2020.

* cited by examiner

UNIFIED COMMUNICATION GATEWAY SYSTEMS

CROSS-REFERENCE TO RELATED APPLICATIONS

This patent application claims priority under 35 USC 120 to U.S. patent application Ser. No. 16/422,625, filed on May 24, 2019, entitled "UNIFIED COMMUNICATION GATEWAY SYSTEMS," the disclosure of which is incorporated herein in its entirety.

FEDERALLY SPONSORED RESEARCH OR DEVELOPMENT

Not Applicable

BACKGROUND

The present disclosure relates to network communication devices, of the type employed in such applications as satellites, intranets, radio frequency networks, or the Internet. More specifically, it relates to network gateway devices of the type that may provide a network communication infrastructure upon which communications are transmitted.

Communication networks typically have a wide array of disparate assets, especially at the edge or user endpoint, that are networked together to provide the ability to intercommunicate—this is particularly true of military networks which utilize tactical radio communications a broad range of applications such as command and control and situational awareness. Such tactical assets could be widely dispersed among a plurality of network infrastructures, for example a land asset infrastructure, a maritime asset infrastructure, an air asset infrastructure, and a space asset infrastructure. Among such assets, sub-infrastructures may be necessary for specialized equipment, such as different models of aircraft. In order to enable all of the assets to be monitored by a single command and control station, network operators oftentimes need to manually transcribe data from one system to another system, causing a substantial delay and hampering real-time efforts to react to exigent circumstances. Some networks may have assets that operate using legacy communication means that are decades old, while others may require a high bandwidth solution. While systems exist to bridge disparate network systems, such systems oftentimes need to be custom-built for each application, leading to an increased cost of creation and maintenance, and are often not scalable or secure.

Thus, it would be desirable to provide scalable, secure gateways that have minimal setup and maintenance requirements.

SUMMARY

A communication system utilizes secure unified gateways to dynamically bridge communication between nodes that address interoperability across all seven layers of the OSI model including physical transmission, security, data interoperability and translation at the presentation and application layers all while taking into account critical performance metrics such as overhead restrictions and latency. The system comprises a source unified gateway that routes data traffic via a data transmitter having restrictions. Such restrictions could comprise discrete transmission networks for both military and commercial application such as common data link radio (CDL), link 16 data networks, variable message format (VMF), satellite transmission networks, adhoc mesh networks, optical networks, cellular, mobile adhoc and mesh networks, optical communications, the Internet, and a local area network (LAN). Such restrictions could also comprise security restrictions, such as a security standard for a network vs a security requirement for a data package, or a portion of a data package. Such restrictions could also comprise size, time, and bandwidth restrictions. The unified gateways analyze restrictions for sets of data and restrictions for various data pathways to determine an optimal data path that satisfies the restrictions.

Communication systems in accordance with this disclosure utilize secure unified gateways to route data traffic between computer systems. As used herein, a "computer system" comprises any suitable combination of computing or computer devices, such as desktops, laptops, cellular phones, blades, servers, interfaces, systems, databases, agents, peers, engines, modules, or controllers, operating individually or collectively. Computer systems and servers may comprise at least a processor configured to execute software instructions stored on a tangible, non-transitory computer readable storage medium (e.g., hard drive, solid state drive, RAM, flash, ROM, etc.). The software instructions preferably configure the computer system and server to execute the functionality as disclosed. As used herein, a "unified gateway" comprises an improved routing device that dynamically bridges communication gaps between data transceivers that have differing transmission, security, and overhead restrictions and metrics.

These and other aspects of the disclosure may be more fully comprehended from the detailed description that follows.

DETAILED DESCRIPTION

Figure 1:
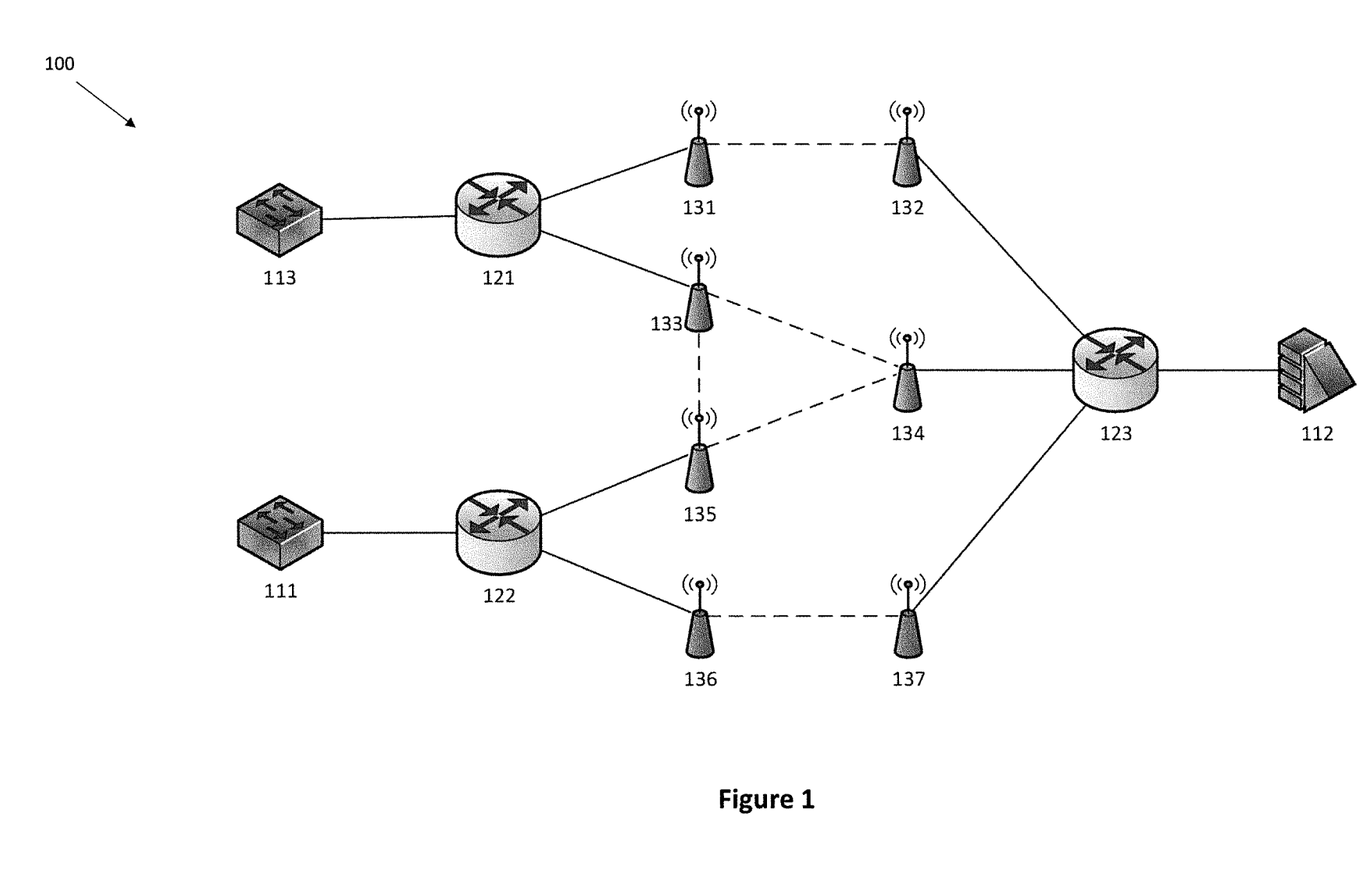
FIG. 1 is a schematic view of a simplified unified gateway system in accordance with embodiments of this disclosure.

FIG. 1 diagrammatically illustrates a simplified data communication system 100 comprising discrete simplified computer systems 111, 112 and 113; unified gateways 121, 122, and 123; and simplified data transceivers 131, 132, 133, 134, 135, 136, and 137.

The simplified computer systems 111, 112 and 113 in FIG. 1 transmit sets of data with one another via the various electronic devices shown. Typically, a command to transmit a set of data from one computer system to another computer system comprises one or more requirements, such as an identifier of a target computer system, a set of security requirements (e.g. a minimum security threshold metric), and a set of QoS (Quality of Service) requirements (e.g. a priority metric, a maximum threshold time period metric). A simplified computer system programmed to transmit a set of data to another computer system typically transmits at least one or more requirements along with a set of data to a router, which chooses a device to which the set of data is to be transmitted. In traditional networks, this device selection is performed based only on information in the network and metadata for the information passing through the system, and the device selection is done without inferring security, criticality, latency, or bandwidth requirements from the information itself.

In such a simplified system, only the unified gateways 121, 122, 123 have the ability to dynamically alter data paths and to alter sets of data that have been received from a computer system or a data transceiver. The data paths shown are disparate from one another insofar as they have differing protocols and attributes. For example, the data path between one pair of data transceivers 136 and 137 may represent a completely secure connection path having the highest security metric of the three data paths; the data path between another pair of data transceivers 131 and 132 may represent a rapid connection having the lowest security metric; and the data paths among the set of data transceivers 133, 134, and 135 may represent a data path having a medium security metric, but with the slowest connections that enable computer systems 111, 112, and 113 to communicate. Each of these groups of connections may utilize different physical, link, network, security, and data protocols that are inherently incompatible with connections made by the other data transceivers. For example, one group of transceivers could use a mesh or cellular radio connection; another group of transceivers could use a LINK-16 radio connection; and another group of transceivers could use a CDL radio connection. When sending a data communication from one unified gateway to another unified gateway, the transmitting unified gateway could translate a set of data to utilize a data protocol of the data transceiver being used, for example by packaging the set of data within a data packet of that protocol, and/or by adding metadata headers used by that protocol. In preferred embodiments, the unified gateway that receives the translated set of data unpackages the set of data upon receipt of the data, which could then be handled in any suitable way, for example by packaging the set of data within a data package of a different protocol to be sent to a different data transceiver, saving the set of data to a cache memory of the unified gateway, or transmitting the set of data to a target computer system functionally connected to the unified gateway.

In preferred embodiments, each unified gateway is interposed between at least one data transceiver and at least one computer system, and each is programmed to calculate various metrics and attributes (e.g. data format requirements) of a data path between data transceivers. In some embodiments, such metrics may be coded in the unified gateway via a table provided by an administrator user (e.g. as is the case with the data path between data transceiver 137 and 138, and the data path between data transceiver 131 and 132), and in other embodiments such metrics could be gleaned from the data transceivers themselves (e.g. the unified gateway transmits a query to a data transceiver and the transceiver returns the metrics to the unified gateway). Alternatively, the metrics could be derived by the unified gateway via algorithms (e.g. the unified gateway records trends of data delays via a data pathway and dynamically updates an internal table with a bandwidth metric, or the unified gateway records infected files received via a data pathway and dynamically updates an internal table with a security metric). In preferred embodiments, a unified gateway can transmit a query to another unified gateway to retrieve data metrics and desired data formats from that unified gateway, and to retrieve target identifiers of connected computer systems and translate/alter data packets to meet disparate standards required by the user and/or the transceiver. In this manner, each unified gateway comprises a table of metrics and data paths to various computer systems.

When a set of data is received by a unified gateway, the unified gateway reviews the target device identifier and identifies all available paths through associated receivers that can reach the target device identifier. In some embodiments, the unified gateway receives the target device identifier with the set of data, for example as a metadata header. In other embodiments, the set of data identifies a cluster of block chain devices that could be accessed by the unified gateway to provide a ledger of target device identifiers. One or more target device identifiers could be retrieved from a block chain ledger to indicate portions of a required data path for a set of data. For every data transceiver having a valid data path to the target device identifier, the unified gateway determines a security metric and an overhead metric of that data path, and chooses a data transceiver having the lowest overhead metric that satisfies the security metric for the set of data. A security metric could be determined in any suitable manner, for example via a user-defined table that assigns a security metric to a transceiver, via an algorithm that calculates a security metric as a function of transceiver capabilities (e.g. encryption algorithms used by a transceiver are assigned weights in an algorithm, types of security vulnerabilities of a transceiver are assigned weights in an algorithm) retrieved from a connected database. The unified gateway could also perform data validity and integrity verification using any suitable technology, from simple checksum to complex blockchain algorithms. This allows the unified gateway system to choose a data transceiver as a function of a data path's security metric, overhead metric, and the security requirement for the set of data, and could ensure data validity and integrity throughout the entire communication chain, preferably at each unified gateway along a data path. Preferably, the unified gateway also reviews a source identifier, quality of service metadata, and contents of the data to determine the security and overhead requirements for the data. A source identifier is an identifier sent with a set of data that identifies a source from which the data originated. A quality of service metadata is a data metric sent with a set of data that is used to identify a metric of importance for the data. In such embodiments, each of the source identifier, quality of service metadata, and identified contents of the data could be used to calculate the security metric and/or the overhead metric.

A unified gateway can also receive requests to monitor traffic that passes through the gateway, and identify sets of data by type. Such a unified gateway is preferably programmed to always save messages using its internal caching/logging system so that it can flag requests for data that pass through the unified gateway from one computer system to another computer system, and pass such flagged requests to the requesting system dynamically upon receipt of the flag. Such requests could be sent to targeted gateways, or only to targeted gateways that have a data path to a target computer system. Such requests could also have priorities associated with them, with prioritized flagged data transmitted before flagged data having a lower priority.

A unified gateway could also parse sets of data for data having a higher security requirement and a lower security requirement, particularly in infrastructure systems where a unified gateway has two or more data paths to another unified gateway, where one data transceiver has a higher security metric and a higher overhead metric than another data transceiver. Unified gateways that identify a set of data that can be parsed, and that identify the existence of two or more data paths, where one data path has a data transceiver with a security metric that satisfies a security requirement of one set of parsed data but does not satisfy a security requirement of another set of parsed data and that has a higher overhead metric than another data path, can parse the data and transmit the higher security data using the data transceiver having the higher security metric and higher overhead metric, and transmit the lower security data using the data transceiver having the lower security metric and the lower overhead metric. The common unified gateway that receives both sets of parsed data could also receive a command to reintegrate the data before transmitting the integrated data to the target computer system, thereby optimizing the data paths.

Since a unified gateway is preferably configured to communicate with a plurality of disparate transceivers, unified gateways preferably comprise a chassis that houses at least one processor configured to communicate with at least two different types of transceivers. For example, one transceiver could be an adhoc mesh radio while another transceiver could be a CDL radio, and device drivers could be installed on the unified gateway for each type of transceiver. Typically, different types of transceivers also have different types of port connections such as ethernet, RS-232, RS-422, 1553-B, Socket-J, Serial-J, LINK-16, and JREAP A/B/C ports. By providing a unified gateway having different types of ports configured to communicate with different types of transceivers, a single unified gateway design could be used in a plurality of different environments.

Figure 2:
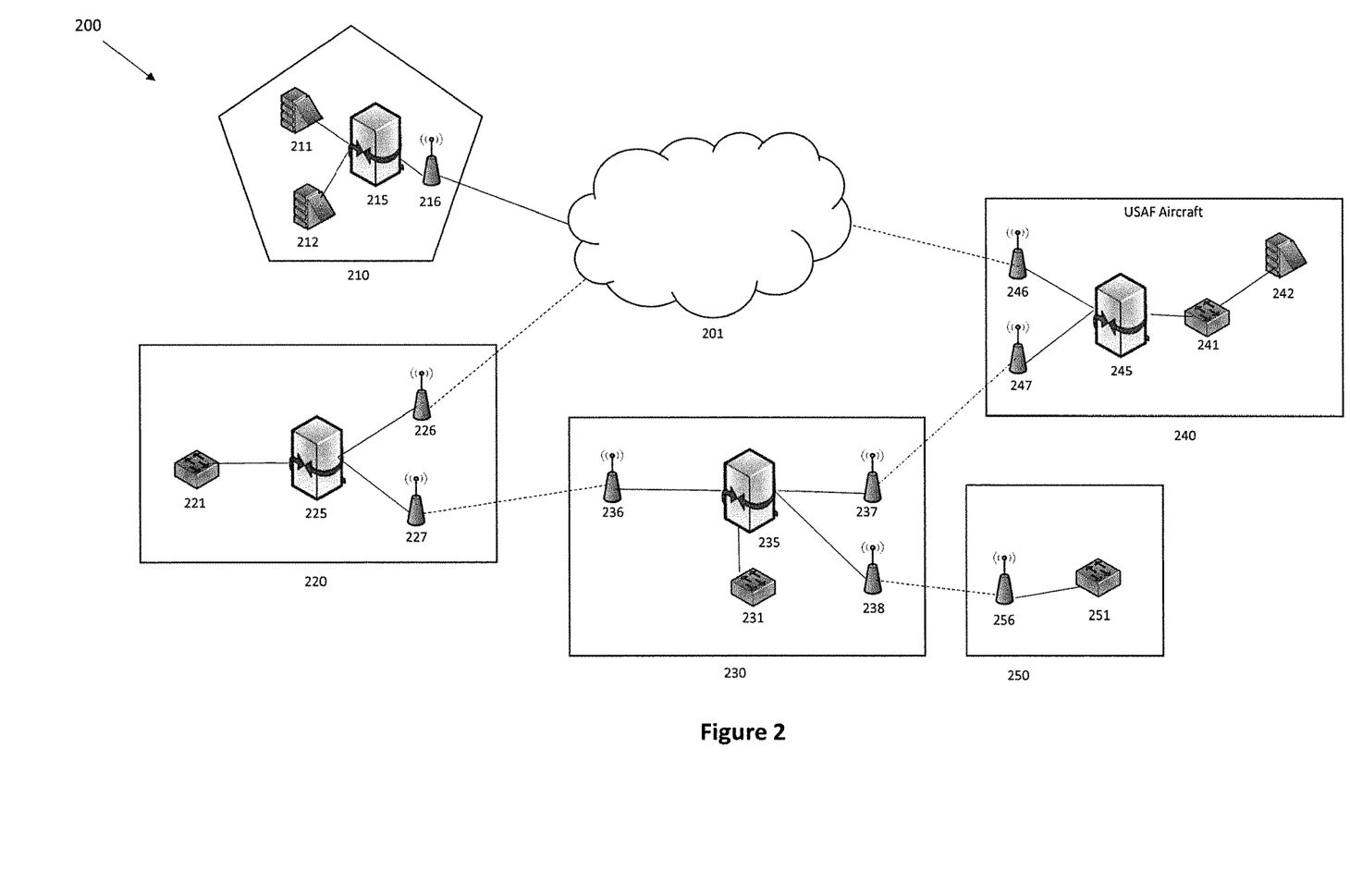
FIG. 2 is a schematic view of an exemplary complex unified gateway system in accordance with embodiments of this disclosure.

In FIG. 2, an exemplary complex data communication system 200 has a common network 201 coupled to first, second, and third discrete terminal communication units 210, 220, and 240, respectively. The second and third discrete terminal communication units 220 and 240 can also communicate with one another and with a fourth discrete terminal communication unit 250 via a data path through a fifth discrete intermediary communication unit 230. One or more of the discrete communication units, according to an aspect of this disclosure, may include a unified gateway (e.g., the unified gateways 215, 225, 235, 245), and one or more computer systems (e.g., the computer systems 211, 212, 221, 231, 241, 242, 251). The computer systems may communicate with one another by sending data to one or more of the unified gateways 215, 245, 225, and 235, which may transmit data to one another via one or more of a plurality of transceivers 216, 246, 247, 226, 227, 236, 237, 238, and 256.

Transceivers that communicate directly with one another, such as the transceiver 227 in the second discrete terminal communication unit 220 and the transceiver 236 in the discrete intermediary communication unit 230, or the transceiver 237 in the discrete intermediary communication unit 230 and the transceiver 247 in the third discrete terminal communication unit 240, communicate using transceiver-specific protocols that can be inherently incompatible with protocols of other transceivers, such as CDL radio, mesh radio, cellular radio, LINK-16 radio, satellite Internet, wired Internet, or any other transceiver-specific protocol. The network 201 represents a cloud-based network, such as the Internet, which is an intermediary network capable of communicating with disparate transceivers. Here, in the illustrated exemplary embodiment, the network 201 communicates with the transceiver 216 in the first discrete terminal communication unit 210 via one protocol, such as a wired Internet connection, while network 201 also communicates with transceivers 226 and 246 in the second and third discrete terminal communication units 220, 240, respectively, via another protocol, such as a satellite Internet connection. Such networks may require additional transceiver-specific protocols used to transmit data that do not necessarily need to be utilized or known by the unified gateways in order to transmit data via the network 201, as the transceivers are typically configured to handle data transport at that level. Each transceiver preferably has a security metric that identifies the level of security of data that is allowed to be transmitted via that particular transceiver. Unified gateways could then block transmissions from using that particular transceiver if the level of the security metric falls below a required threshold, and/or could transmit notifications to a sending computer system that a transmission has been blocked due to insufficiently secure access via a data pathway.

Preferably, each unified gateway has a memory having a table of unified gateways and computer systems that the unified gateway has communicated with. In some embodiments, this table could be added/modified by an administrator user, while in other embodiments this table could be dynamically generated via requests. For example, the unified gateway 215 in the first discrete terminal communication unit 210 may have unique identifiers for the transceiver 226 connected to unified gateway 225 and the transceiver 246 connected to unified gateway 245, which allow data traffic to be sent to the respective transceivers by utilizing the unique identifiers to target the respective transceivers. Unified gateway 215 could then send a query for connected computer systems and unified gateways to unified gateway 225 using the unique identifier for the transceiver 226 and to unified gateway 245 using the unique identifier for the transceiver 246. Unified gateway 225 could then return data regarding computer system 221 in the second discrete terminal communication unit 220, such as a unique identifier and meta-data regarding the computer system (e.g. datatypes, a type of computer system, a version of the computer system), and data regarding unified gateway 225's connection with unified gateway 235 via data transceivers 227 and 236 (e.g. type of transceivers, unique identifiers of transceivers, security metrics used by the transceivers, average bandwidth of transceivers). Unified gateway 225 could also forward that request to unified gateway 235. Unified gateway 245 could also return data regarding connected computer system 241 and/or data regarding connected computer system 242, data regarding unified gateway 245's connection with unified gateway 235 via data transceivers 247 and 237, and it could also forward that request to unified gateway 235. Unified gateway 235 could also return data (to one or both of unified gateways 225 and 245, as it received requests from both) regarding connected computer system 231 and data regarding unified gateway 235's connection to computer system 251 via data transceivers 238 and 256.

Any suitable network crawling algorithm could be used to inventory network paths, with each unified gateway utilizing corresponding transceiver protocols to crawl available network paths by using unified gateways as a network layer. For example, in an embodiment where transceiver 216 is configured to communicate with network 201 via a wired ethernet network connection, and transceiver 246 is configured to communicate with network 201 via a wireless satellite network connection, both transceiver 216 and transceiver 246 could be configured to share the same DNS. In such an embodiment, unified gateway 215 could send use a LAN or Web crawling bot to periodically query the DNS for new unified gateways that are functionally coupled to the DNS. In an embodiment where transceivers 237 and 247 are configured to communicate with one another over a LINK-16 JREAP (Joint Range Extension Applications Protocol) connection, unified gateways 245 and 235 may need to be manually configured to connect to one another using authorized channels. Preferably, once a unified gateway is connected to another unified gateway, either using a network crawling algorithm or using a manual setup, a source unified gateway can query a targeted unified gateway to determine what unified gateways the targeted unified gateway is connected to, and so on and so forth. For example, where transceivers 216 and 246 use a TCP/IP network connection to connect to one another, transceivers 247 and 237 use a LINK-16 network connection to connect to one another, and transceivers 227 and 236 use a CDL radio connection to connect to one another, unified gateway 215 could transmit a query to unified gateway 245 using a TCP/IP-formatted message to determine devices that unified gateway 245 is configured to communicate with, unified gateway 245 could transmit a query to unified gateway 235 using a LINK-16 formatted message to determine devices that unified gateway 235 is configured to communicate with, and unified gateway 235 could transmit a query to unified gateway 225 using a CDL-radio-formatted message to determine devices that unified gateway 225 is configured to communicate with.

In some embodiments, each unified gateway's memory only saves data paths of unified gateways across one pair of transceivers, minimizing the need to track data regarding every unified gateway in a large network system. In such an embodiment, unified gateway 215 saves unique identifiers for unified gateway 225 connected via data path 216 and 226, and unique identifiers for unified gateway 245 connected via data path 216 and 246. Unified gateway 225 saves unique identifiers for unified gateway 215 connected via data path 226 and 216, and unique identifiers for unified gateway 235 connected via data path 227 and 236. Unified gateway 245 saves unique identifiers for unified gateway 215 connected via data path 246 and 216, and for unified gateway 235 connected via data path 247 and 237. Lastly, unified gateway 235 saves unique identifiers for unified gateway 225 connected via data path 227 and 236, unified gateway 245 connected by data path 237 and 247, and computer system 251 connected by data path 238 and 256.

While each unified gateway may require specialized drivers and/or ports to communicate with each disparate transceiver, the computer systems could have a common interface to each unified gateway, without requiring any information regarding the data transceivers or the protocols that they use. For example, computer system 212 could transmit the same command to the unified gateway 215 in order to have unified gateway 215 query computer system 241 as it would query computer system 231, differing only in the identifier of the target computer system, even if transceivers 216 and 246 use a first protocol and transceivers 237 and 247 use a second protocol. When unified gateway 215 transmits the command to computer system 241, unified gateway 215 could package the command using the first protocol to send the command from transceiver 216 to transceiver 246, whereupon unified gateway 245 then unpackages the command and transmits the command to computer system 241. When unified gateway 215 transmits the command to computer system 231, unified gateway 215 could package the command using the first protocol to send the command from transceiver 216 to transceiver 246, whereupon unified gateway 245 then unpackages the command and repackages the command using the second protocol to send the command from transceiver 247 to transceiver 237, whereupon unified gateway 235 then unpackages the command and transmits the command to computer system 231.

Figure 3:
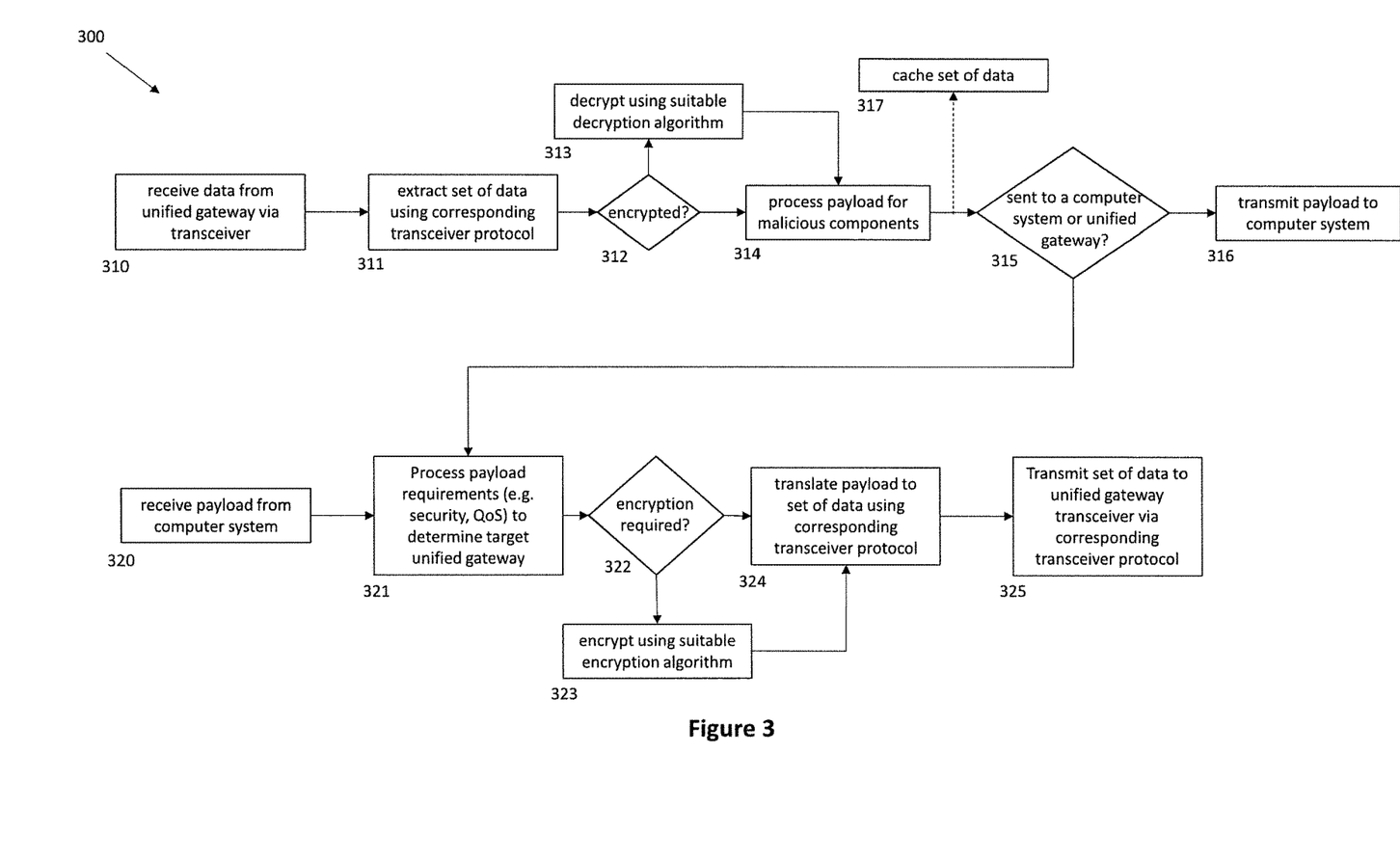
FIG. 3 is a flowchart of a method of processing sets of data that are transmitted to and from a unified gateway in accordance with embodiments of this disclosure.

FIG. 3 is a flowchart 300 of a method of processing sets of data that are transmitted to and from a unified gateway in accordance with embodiments of this disclosure. A unified gateway can receive data either from a unified gateway via a transceiver in step 310, such as unified gateway 245 receiving data from unified gateway 235 via transceivers 237 and 247, or receive data from another computer system in its routing infrastructure in step 320, such as unified gateway 215 receiving data from computer system 211. When the unified gateway receives a data package via a transceiver in step 310, the unified gateway generally extracts a set of data from the received package using the transceiver protocol of the transceiver in step 311. The unified gateway then analyzes the set of data in step 312 to determine whether or not the set of data is encrypted. If the set of data is encrypted, the unified gateway can decrypt the data in step 313. Preferably, the unified gateway then processes the unencrypted payload for malicious components in step 314 and determines the integrity of the payload, for example by comparing the payload to a checksum or a block chain ledger. If the payload is compromised, the unified gateway could transmit a notification to at least one of the sending entity or a target entity, and could even alter a security metric of the transceiver that transmitted the data, particularly if the transceiver repeatedly transmits compromised data.

If the set of data is clean, the unified gateway could then transmit the payload to a computer system on the local routing infrastructure, such as computer system 211 from unified gateway 215, or if the set of data is destined for further transmittal to another unified gateway, the system proceeds to step 321 to process the payload to verify transmission requirements. In some embodiments, the unified gateway could cache the set of data in step 317, for example in a rotating buffer, or could save a portion of the set of data, for example a transaction receipt of a source identifier, target identifier, type of data transmitted, and an overhead delay, which could be used by one or more unified gateways to determine latency through the unified gateway.

Whether a data payload is received from a computer system via step 320 or from another unified gateway via step 315, the unified gateway processes the payload requirements to determine a target unified gateway in step 321. As previously stated, the determination of the data path is preferably determined as a function of at least a QoS metric and a security metric of the set of data. In some embodiments, where the set of data has been received from a unified gateway that has already calculated a data path, or where a data path has been saved in a block chain associated with the set of data, the unified gateway could determine a target unified gateway and/or associated transceiver by analyzing metadata sent with the set of data and/or a block chain ledger. In some embodiments, when a unified gateway determines an optimal data path, the unified gateway writes at least a portion of the data path to the block chain ledger for retrieval by other unified gateways, for example at least the ultimate source and target computer systems, or in some embodiments the entire data path including transceivers.

In step 322, the unified gateway determines if encryption is required in accordance with the requirements of the set of data, and encrypts the set of data in step 323 using any suitable algorithm. Preferably, the set of data is encrypted in step 323 and decrypted in step 313 in accordance with industry standards. In step 324, the unified gateway translates the payload to a set of data that can be transmitted using the transceiver associated with the target unified gateway in using the corresponding transceiver protocol, and transmits the set of data to the unified gateway transceiver using the corresponding transceiver protocol in step 325. For example, when unified gateway 245 transmits data to unified gateway 235, the data is first packaged in accordance with the transceiver protocol of transceiver 247 before being transmitted to transceiver 237 for receipt by unified gateway 235.

Figure 4:
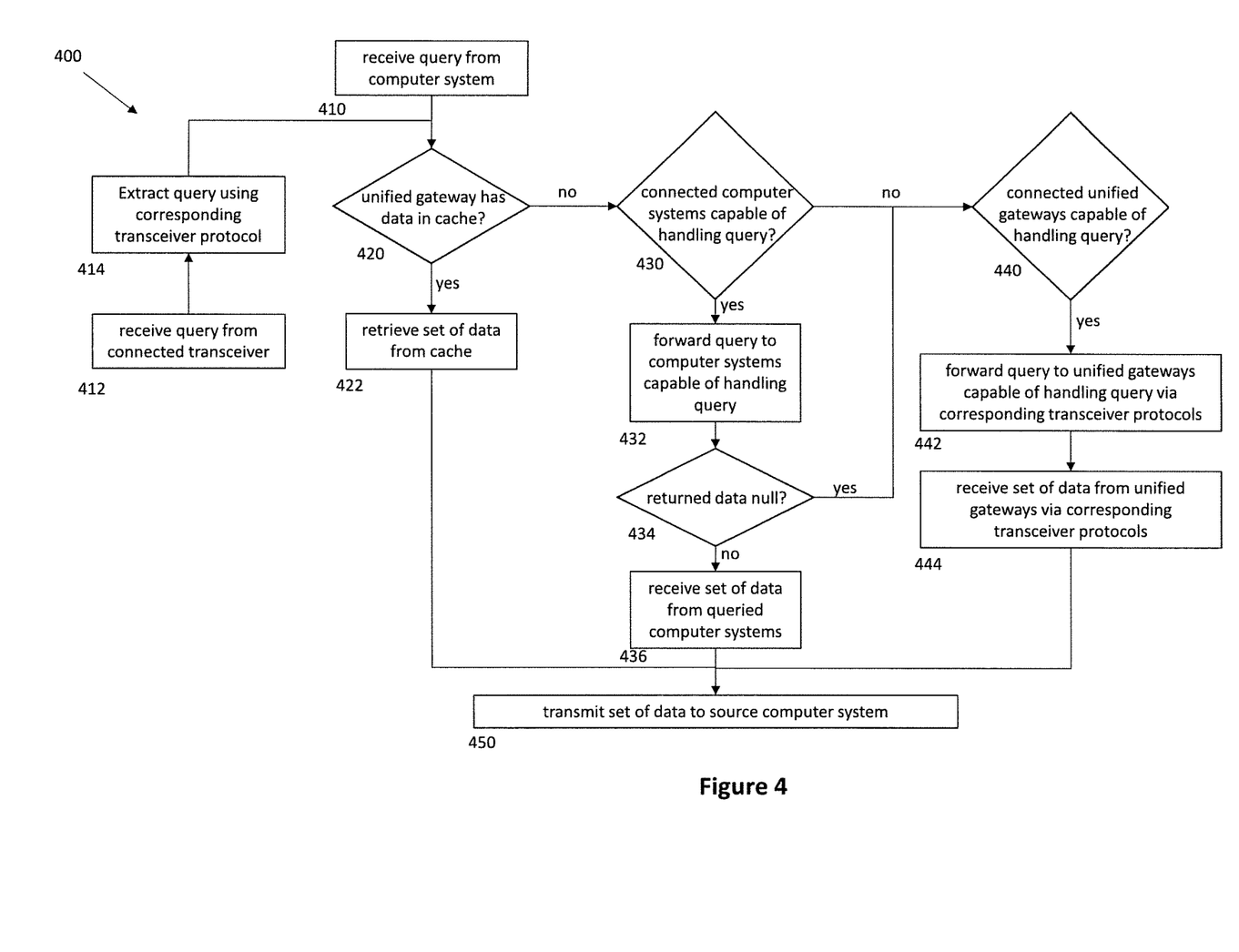
FIG. 4 is a flowchart of a method of utilizing a unified gateway as a virtualized database in accordance with embodiments of this disclosure.

In some embodiments, one or more of the unified gateways could be used as a virtualized database. FIG. 4 shows a flowchart 400 of a method that could be used to transmit a query to a unified gateway. The unified gateway could receive the query from either another unified gateway's transceiver in step 412, which would need to be extracted in step 414 to be analyzed by the unified gateway, or it could receive the query from a computer system in step 410. In embodiments where the unified gateway saves some previously transmitted sets of data in its local memory cache, the unified gateway could check its cache in step 420 and retrieve the set of data in step 422. Otherwise, the unified gateway could determine whether any of its connected computer systems are capable of handling the query in step 430. If the computer system returns data in accordance with the query, then the computer system could receive the set of data in step 436. Otherwise, if the computer system returns null information, the unified gateway could determine whether other unified gateways are capable of handling the query in step 440, for example by forwarding the query to all other known unified gateways for data having that datatype identifier using data paths known to the unified gateway in step 442. In step 444, the unified gateway receives the set of data from any target unified gateways via their corresponding transceiver protocols. When a unified gateway receives the same request from two different data paths, preferably the unified gateway processes only the first request, and ignores the second request (e.g. by saving an identifier of the first request in memory for a period of time, and ignoring all subsequent requests having that identifier). Whether the set of data is retrieved from the cache of unified gateway 215, a computer system connected to unified gateway 215, or from another unified gateway, the set of data is forwarded to the source computer system. In this exemplary scenario, the set of data is transmitted back to computer system 212 via unified gateway 215.

An example of such a unified gateway is described below with respect to the computers of FIG. 2. In this example, computing system 212 could transmit a query to unified gateway 215 for all data identified with a datatype identifier—for example "LOC_FR_GR_AS" standing for a location of friendly ground assets, which is only saved on computer system 251 in discrete unit 250. Unified gateway could then query all connected computer systems, such as computer system 211, which returns null information, and could also forward this query to all other known unified gateways for data having that datatype identifier using data paths known to unified gateway 215. In this example, unified gateway 215 could transmit a query to unified gateway 245 via data transceivers 216 and 246, and a query to unified gateway 225 via data transceivers 216 and 226. Unified gateway 245 queries all connected computer systems, such as computer system 241, which in turn queries computer system 242—both of which return null information—and forwards the query to unified gateway 235 via data transceivers 247 and 237. Unified gateway 225 queries all connected computer systems, such as computer system 221, which returns null information, and forwards the query to unified gateway 235 via data transceivers 227 and 236. When a unified gateway receives the same request from two different data paths, preferably the unified gateway processes only the first request, and ignores the second request (e.g. by saving an identifier of the first request in memory for a period of time, and ignoring all subsequent requests having that identifier). Unified gateway 235 then processes the first request that is received by querying all connected computer systems, such as computer system 231, which returns null information, and computer system 251 via data transceivers 238 and 256, whereupon computer system 251 returns data having that datatype identifier "LOC_FR_GR_AS" to unified gateway 235. That data is then forwarded to the first unified gateway that transmitted the request, and then back to computer system 212 via unified gateway 215.

Figure 5:
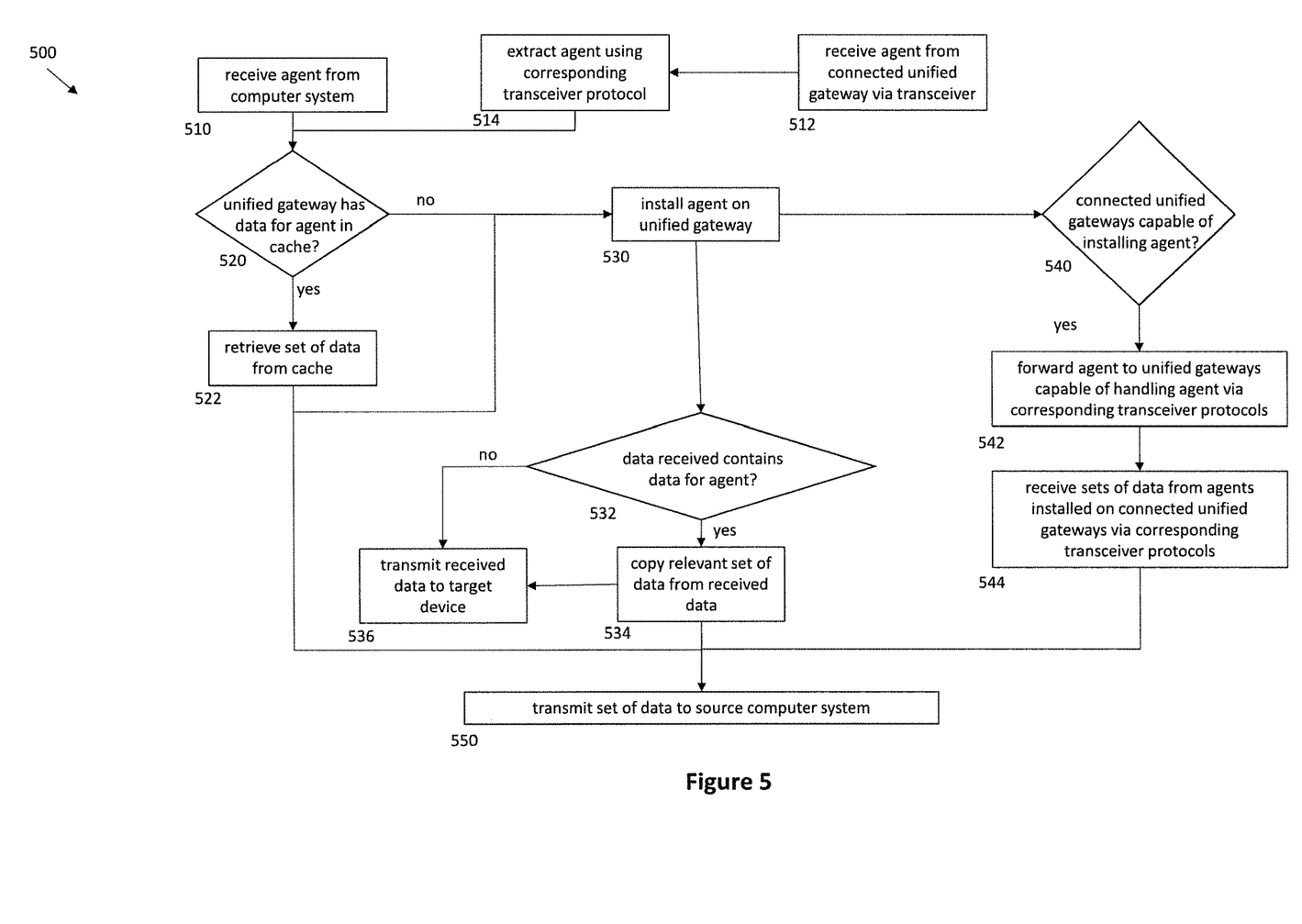
FIG. 5 is a flowchart of a method of utilizing a unified gateway to monitor data transmitted within a communication system in accordance with embodiments of this disclosure.

In some embodiments, unified gateways could have one or more agents installed that copy and redirect portions of data to one computer system that are transmitted using the unified gateway for transport to another computer system. FIG. 5 is a flowchart 500 of a method of utilizing a unified gateway to monitor data transmitted within a communication system in accordance with embodiments of this disclosure. As used herein, an "agent" could be an executable computer program, or it could be a query having a termination condition that is installed on a unified gateway until the termination condition occurs. In preferred embodiments, the agent has a termination condition to delete themselves if a time metric of the unified gateway exceeds a minimum time threshold provided by the agent, such as when the agent has been installed on the unified gateway for more than a week. Agents could be transmitted to a unified gateway from a computer system in step 510, or from a transceiver of a connected unified gateway in step 512, which would need to be extracted in step 514 using the corresponding transceiver protocol. In embodiments where a unified gateway keeps historical sets of data in a local memory cache, in step 520 the unified gateway could check its cache to determine if any data in the cache is relevant to the agent, and could retrieve that data in step 522 and transmit that data to the source computer system in step 550. The unified gateway installs the agent on the unified gateway in step 530 and analyzes traffic transmitted through the unified gateway, either from connected computer systems, or from connected unified gateways. If the data sent through the unified gateway matches a query of the agent, the unified gateway could then copy relevant data from the received data in step 534 and transmit that set of data to the source computer system in step 550 before, after, or asynchronously with its data transmission of the data to the target device in step 536. In step 540, the unified gateway determines if any connected unified gateways are capable of installing the agent and, if so, forwards the agent to the applicable connected unified gateways in step 542 and can act as an intermediary to receive those sets of data in step 544. In some embodiments, the connected unified gateways could determine that an optimal data path for the data in question is not back to the unified gateway that initially transmitted the agent to the connected unified gateway, and could bypass the source unified gateway during the subsequent transmission.

An example of such an agent transmitted from a computer system to a unified gateway is described below with respect to the computers of FIG. 2. In this example, computer system 212 could transmit a request to unified gateway 215 to install an agent to forward all data identified with a datatype identifier, for example "LOC_FR_GR_AS," which is only produced by computer system 251 in discrete unit 250, to computer system 212. Preferably, the request is accompanied with a termination condition, for example a period of time before the agent is deactivated or uninstalled, or a command that, when received by the unified gateway, uninstalls or deactivates the agent. Similar to the request for data, this agent is installed on unified gateway 215, and the request is forwarded to each of the unified gateways 245, 225, and 235, or to only unified gateways specified by computer system 212 or unified gateway 215. When computer system 251 transmits data that matches the search criteria to any target computer system over data transmission devices 256 and 238 to unified gateway 235, the unified gateway 235 can scan the data, discover the datatype within the data being sent, and make a copy of the datatype before then transmitting that data to the target computer system. Unified gateway 235 adds a target identifier of computer system 212 to the data copy, which is then forwarded to computer system 212 via the appropriate data paths. In preferred embodiment, unified gateway 235 adds both target identifiers to the copied data and additional derived security and performance metadata to the data payload. In preferred embodiments, the data include a set of security requirements (e.g. a security metric threshold) and a set of QoS requirements that are sent to unified gateway 235 with the data from computer system 251, while in other embodiments unified gateway 235 could first transmit a query to computer system 251 to determine the security metric threshold and/or the QoS metric before performing its analysis. In some embodiments, the QoS metric is provided by the agent, which receives a QoS metric from computer system 212's original request to install the agent. Unified gateway 235 then performs an analysis on the data to determine the most appropriate data path. The analysis comprises determining the relative speed of the data path (average time for data of a certain size to be sent from unified gateway 235 to unified gateway 215 via data transceivers 236, 227, 226, and 215 vs. data transceivers 237, 247, 246, and 216) and whether a security metric (lowest security metric of data transceivers on that data path) is above a security metric threshold for the data. Unified gateway 235 can evaluate the overhead and security metrics of all paths available to send the copied data to unified gateway 215 and finally to computer system 212. Unified gateway 235 could identify the path through discrete segment 220 as the optimal route satisfying the security metric threshold, and then forward the data to unified gateway 225 using data transmission devices 236 and 227. When unified gateway 225 receives the data, it reviews the target identifier, security and performance metadata to determine the data should be forwarded over common network 201. Unified gateway 225 then sends the data over transmission device 226 to transmission device 216 over common network 201, reaching unified gateway 215. Unified gateway 215 parses the metadata provided by unified gateway 235 and forwards the relevant data to computer system 212. In some embodiments a unified gateway has a cache that saves transmitted sets of data for a period of time, for example in a rotating memory cache that overwrites old sets of data when new sets of data are transmitted, or that allow sets of data to be deleted after a threshold period of time specified by an administrator user (e.g. one day, one week, one month). In such embodiments, when the agent is installed on unified gateway 235, unified gateway 235 could review sets of data within the cache to identify if any previously sent data matches the data request, and send the data back to computer system 212 over the most efficient path.

In other embodiments, the unified gateways could have one or more agents installed that could redirect requests from one computer system to another computer system capable of handling that request. For example, computer system 241 could publish an agent to unified gateway 245 that indicates the ability to respond to certain data requests, such as a request for imagery of a location. As before, the agent preferably has a termination condition. This agent could be published to all connected unified gateways, or only to unified gateways specified by computer system 241 or unified gateway 245, such as only unified gateway 235. Computer system 251 could then request imagery information from computer system 231 via unified gateway 235 and transceivers 238 and 256. When unified gateway 235 receives the data request, the gateway evaluates the request against its data routing table. Since the request is intended for computer system 231, unified gateway 235 forwards the data request to computer system 231. If computer system 231 then returns imagery information to unified gateway 235, unified gateway 235 could then process and transmit the data in any suitable manner previously described. However, if computer system 231 returns a null value or a "request denied" response, or is otherwise unable to meet the request, unified gateway 235 could then retrieve the original request message from its cache, and forward the request to discrete segment 240 utilizing the protocol implemented by transmission devices 237 and 247. Unified gateway 245 then transmits this request to computer system 241, which could then satisfy the request, and discrete segment 240 could then respond with the requested data to unified gateway 235 utilizing the same protocol used by data transmission devices 237 and 247. Unified Gateway 235 then forwards the requested data to computer system 251.

Figure 6:
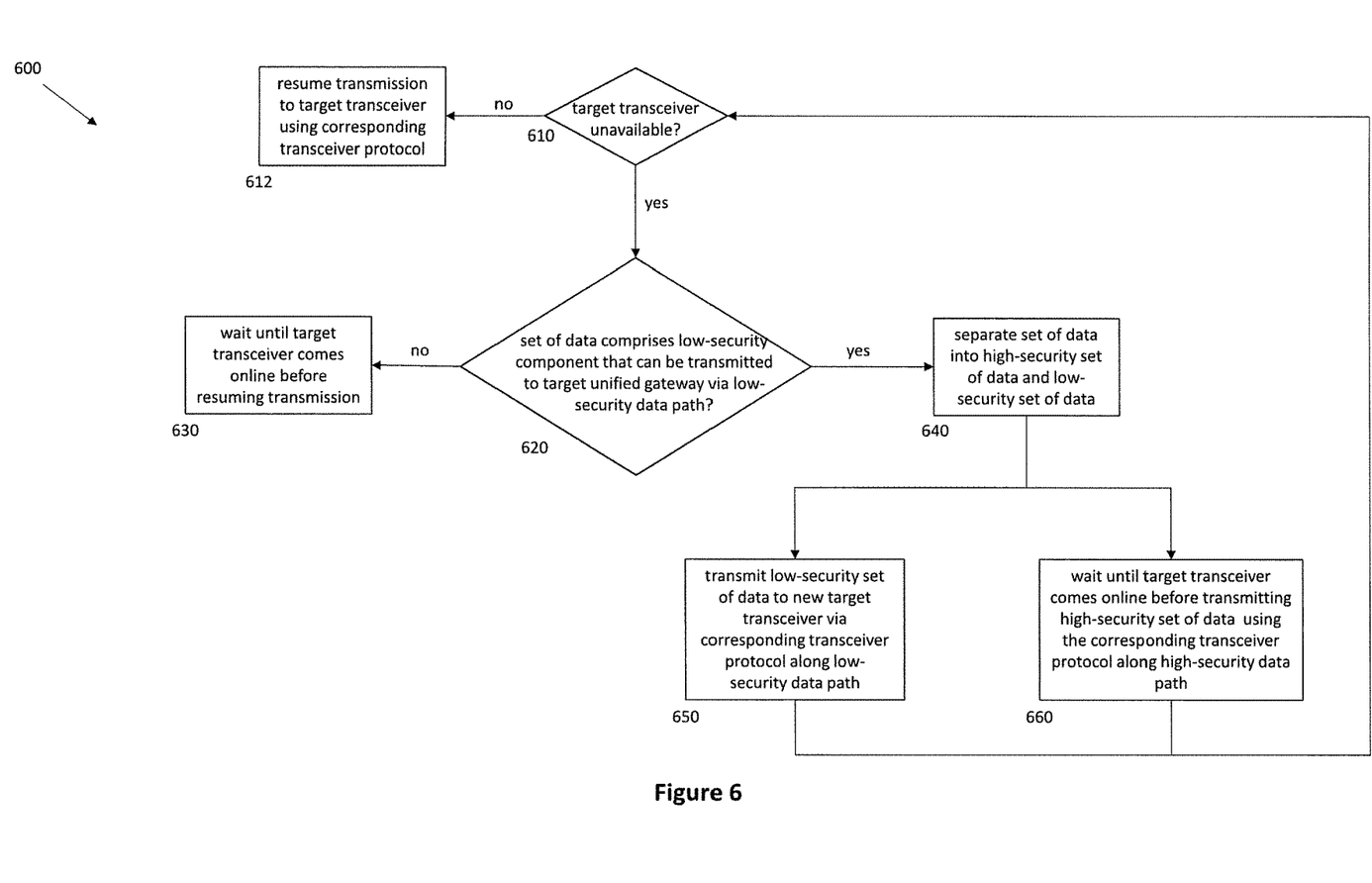
FIG. 6 is a flowchart of a method of securely redirecting sets of data mis-transmission within a communication system in accordance with embodiments of this disclosure.

In yet another embodiment, unified gateways could dynamically redirect secure data appropriately mid-transmission. FIG. 6 is a flowchart 600 of a method of securely redirecting sets of data mis-transmission within a communication system in accordance with embodiments of this disclosure. If a target transceiver becomes unavailable to transmit a set of data in step 610, then the unified gateway could determine if the set of data could be partitioned into a low-security set of data and a high-security set of data in step 620, where the low-security set of data could be transmitted via an available data pathway that does not run through the now unavailable data transceiver. If the data cannot be partitioned, the unified gateway waits for the unavailable data transceiver to become available in step 630. If the data can be partitioned, in step 640 the unified gateway separates the set of data into a high-security set of data and a low-security set of data, and transmits the low-security set of data along the low-security data path in step 650, while waiting for the target high-security transceiver to become available in step 660, whereupon the unified gateway transmits the high-security set of data to the target device via the high-security transceiver in step 660. The low-security and high-security sets of data are preferably accompanied with a flag that indicates that the data have been partitioned so that a receiving unified gateway could then join the high and low-security sets of data before transmitting the completed set of data to the target computer system.

An example of such an incident occurring with a unified gateway is described below with respect to the system of FIG. 2. In this example, computer system 242 could transmit a data message that contains data at a high security level that is only allowed to transmit over data transmission device 246 to data transceiver 216 to be consumed by computer system 211. However, data transmission device 246 could lose connection with network 201 during operation. In this case, unified gateway 245 could then attempt to identify an alternate path to unified gateway 215 to send the data: first to unified gateway 235 via data transmission devices 237 and 247, then to unified gateway 225 via transmission devices 236 and 227, then to unified gateway 215 via transmission device 226. Unified gateway 245 could retrieve a security metric for every transceiver along the path (e.g. by querying each unified gateway along the path) to determine the lowest security metric of any of the transmission devices on this path. If the lowest security metric on the data path meets the security requirements of the data transmission, unified gateway 245 could then transmit data to computer system 211 via the new data path. However, if the lowest security metric on the data path does not satisfy the required security threshold, unified gateway 245 could be configured to attempt to establish a dynamic encrypted communications channel having a security metric that satisfies the required security metric threshold with unified gateway 215 through the data path to send the data. If the encrypted channel can be established, then the data could be transmitted using the established encrypted channel. If the encrypted channel cannot be established, or if the appropriate unified gateway is not configured to establish the security channel, unified gateway 245 could be configured to split the data into two messages: Message 1 and Message 2. Message 1 would only contain lower security level data acceptable to send over the new link, while Message 2 would only contain the higher security level information that cannot be sent over the newly established link. In these embodiments, unified gateway 245 needs to identify the security metric of each part of the set of data, and repacketize Message 1 where all of the data in that packet has security requirements that can be met by the new data path with a low security metric. Unified gateway 245 also preferably adds metadata to both Message 1 and Message 2 to indicate the messages are related. Unified gateway 245 caches Message 2 until transmission device 246 re-establishes connection to network 201, then sends Message 1 over the less secure link over unified gateways 235, 225, and 215. Unified gateway 215 uses the metadata on Message 1 to determine the message is incomplete, and caches the message for reconstruction when Message 2 is received. In some embodiments, unified gateway 215 could be programmed to forward the incomplete Message 1 to enable partial processing by computer system 211. When transmission device 216 re-establishes connection to network 201, unified gateway 245 sends Message 2 to unified gateway 215 using transmission device 246 and 216. Unified gateway 215 receives Message 2 and could identify it as relating to Message 1 based on message metadata attached by unified gateway 245. Unified gateway 215 then preferably reconstructs the original data with Message 1 and Message 2 based on the provided metadata, and forwards the completed message to computer system 211

It will be appreciated from the foregoing that the systems and methods disclosed herein can be adapted to a wide variety of unified gateway systems, and that unified gateway systems employing this feature can be operated to provide optimized dynamic data paths for systems having simplistic data architecture as will be suitable to different applications and circumstances. It will therefore be readily understood that the specific embodiments and aspects of this disclosure described herein are exemplary only and not limiting, and that a number of variations and modifications will suggest themselves to those skilled in the pertinent arts without departing from the spirit and scope of the disclosure.

What is claimed is:

1. A method, comprising:
   receiving, by a receive port of a first unified gateway, a data set for transmission to a target data transceiver;
   determining, by the first unified gateway and based on the data set, a security requirement identifying a security level for at least a portion of the data set, an identifier identifying the target data transceiver, a latency requirement indicating a threshold delay for transmitting the data set, and a bandwidth requirement indicating link bandwidth to transmit the data set;
   calculating, by the first unified gateway, a security metric and an overhead metric of a plurality of valid data paths from a transmit port to the target data transceiver, each valid data path including at least one data transceiver of a plurality of data transceivers forming one or more communication networks;
   comparing, by the first unified gateway, the security metric and the overhead metric of each valid data path and an associated data transceiver with the security requirement, the latency requirement, and the bandwidth requirement;
   selecting, by the first unified gateway and based on the comparison, an optimal valid data path with an optimal data transceiver for transmitting the data set to the target data transceiver;
   determine the optimal, by the first unified gateway, data transceiver from among the plurality of data transceivers is unavailable to receive the data set from the first unified gateway, the first unified gateway interposed between the plurality of data transceivers forming one or more communication networks;
   splitting, by the first unified gateway, the data set into a first lower-security portion having a lower security requirement, and a second higher-security portion having the security requirement, the security requirement being higher than the lower security requirement;
   updating, by the first unified gateway, the first lower-security portion and the second higher-security portion with an indicator to indicate that the first lower-security portion and the second higher-security portion are related;
   transmitting, by the first unified gateway, the first lower-security portion to a first data transceiver from among the plurality of data transceivers having a lower security metric that meets the security requirement; and
   transmitting, by the first unified gateway, the second higher-security portion to a second data transceiver from among the plurality of data transceivers having the security metric that meets the security requirement.

2. The method of claim 1, further comprising:
   receiving, by a second unified gateway, the first lower-security portion from the first data transceiver and the second higher-security portion from the second data transceiver; and
   utilizing, by the second unified gateway, the indicator to combine the first lower-security portion and the second higher-security portion to reconstruct the data set.

3. The method of claim 1, further comprising:
prior to separating the data set, determining, by the first unified gateway that the data set can be separated into the first lower-security portion and the second higher-security portion.

4. The method of claim 3, further comprising:
waiting, by the first unified gateway, for the target data transceiver to become available, when the first unified gateway determines that the data set cannot be separated into the first lower-security portion and the second higher-security portion.

5. The method of claim 1, wherein updating, by the first unified gateway, the first lower-security portion and the second higher-security portion comprises:
adding, by the first unified gateway, metadata to the first lower-security portion and the second higher-security portion to indicate that the first lower-security portion and the second higher-security portion are related.

6. The method of claim 5, further comprising:
receiving, by a second unified gateway, the first lower-security portion from the first data transceiver, before receiving the second higher-security portion;
upon receipt of the first lower-security portion, utilizing, by the second unified gateway the metadata to determine that the data set is incomplete; and
caching, by the second unified gateway, the first lower-security portion of the data set.

7. The method of claim 6, further comprising:
receiving, by the second unified gateway, the second higher-security portion from the second data transceiver, after receiving the first lower-security portion;
utilizing, by the second unified gateway, metadata of the second higher-security portion to identify the cached first lower-security portion; and
reconstructing, by the second unified gateway, the data set using the cached first lower-security portion and the received second higher-security portion.

8. A non-transitory machine-readable medium having stored thereon instructions comprising machine executable code, which when executed by a machine causes the machine to:
receive, by a receive port of a first unified gateway, a data set for transmission to a target data transceiver;
determine, by the first unified gateway and based on the data set, a security requirement identifying a security level for at least a portion of the data set, an identifier identifying the target data transceiver, a latency requirement indicating a threshold delay for transmitting the data set, and a bandwidth requirement indicating link bandwidth to transmit the data set;
calculate, by the first unified gateway, a security metric and an overhead metric of a plurality of valid data paths from a transmit port to the target data transceiver, each valid data path including at least one data transceiver of a plurality of data transceivers forming one or more communication networks;
compare, by the first unified gateway, the security metric and the overhead metric of each valid data path and an associated data transceiver with the security requirement, the latency requirement, and the bandwidth requirement;
select, by the first unified gateway and based on the comparison, an optimal valid data path with an optimal data transceiver for transmitting the data set to the target data transceiver;
determine, by a unified gateway the optimal data transceiver from among the plurality of data transceivers is unavailable to receive the data set from the unified gateway, the unified gateway interposed between the plurality of data transceivers forming one or more communication networks;
determine, by the unified gateway, whether the data set is partitionable into a first lower-security portion with a lower security requirement and a second higher-security portion with the security requirement, the security requirement higher than the security requirement;
split, by the unified gateway, the data set into the first lower-security portion and the second higher-security portion;
add, by the unified gateway, metadata to the first lower-security portion and the second higher-security portion to indicate that the first lower-security portion and the second higher-security portion are related;
identify, by the unified gateway, a first data transceiver with a lower security metric that meets the security requirement, and a second data transceiver with the security metric that meets the security requirement; and
transmit, by the unified gateway, the first lower-security portion to the first data transceiver and the second higher-security portion to the second data transceiver.

9. The non-transitory machine-readable medium of claim 8, wherein the machine executable code further causes the machine to:
receive, by the target data transceiver, the first lower-security portion from the first data transceiver and the second higher-security portion from the second data transceiver; and
utilize, by the target data transceiver, the metadata to combine the first lower-security portion and the second higher-security portion to reconstruct the data set.

10. The non-transitory machine-readable medium of claim 8, wherein the machine executable code further causes the machine to:
wait, by the unified gateway, for the target data transceiver to become available to transmit the data set, when the unified gateway determines that the data set cannot be separated into the first lower-security portion and the second higher-security portion.

11. The non-transitory machine-readable medium of claim 8, wherein the machine executable code further causes the machine to:
receive, by the target data transceiver, the first lower-security portion from the first data transceiver, before receiving the second higher-security portion;
utilize, by the target data transceiver, the metadata to determine that the data set is incomplete; and
cache, by the target data transceiver, the first lower-security portion of the data set.

12. The non-transitory machine-readable medium of claim 11, wherein the machine executable code further causes the machine to:
receive, by the target data transceiver, the second higher-security portion from the second data transceiver, after receiving the first lower-security portion;
utilize, by the target data transceiver, metadata of the second higher-security portion to identify the cached first lower-security portion; and
reconstruct, by the target data transceiver, the data set using the cached first lower-security portion and the received second higher-security portion.

13. The non-transitory machine-readable medium of claim 11, wherein the machine executable code further causes the machine to:

determine, by the unified gateway, a set of attributes for the data set to identify the security requirement for transmitting the data set; and identify, by the unified gateway, the plurality of valid data paths from the unified gateway to the target data transceiver, each valid data path including at least one of the plurality of data transceivers; and determine, by the unified gateway, the security metric of each of the plurality of valid data paths and at least one of the plurality of data transceivers associated with each valid data path.

14. A unified gateway, comprising:

a transmit port configured to transmit data and a receive port configured to receive data;

a memory containing machine readable medium comprising machine executable code having stored thereon instructions; and a processor coupled to the memory configured to execute the machine executable code to:

receive, at the receive port, a data set for transmission to a target data transceiver;

determine, based on the data set, a security requirement identifying a security level for at least a portion of the data set, an identifier identifying the target data transceiver, a latency requirement indicating a threshold delay for transmitting the data set, and a bandwidth requirement indicating link bandwidth to transmit the data set;

calculate a security metric and an overhead metric of a plurality of valid data paths from the transmit port to the target data transceiver, each valid data path including at least one data transceiver of a plurality of data transceivers forming one or more communication networks;

compare the security metric and the overhead metric of each valid data path and an associated data transceiver with the security requirement, the latency requirement, and the bandwidth requirement;

select, based on the comparison, an optimal valid data path with an optimal data transceiver for transmitting the data set to the target data transceiver;

determine the optimal data transceiver from among the plurality of data transceivers is unavailable to receive the data set from the transmit port, the unified gateway interposed between the plurality of data transceivers forming one or more communication networks;

determine whether the data set is partitionable into a first lower-security portion associated with a lower security requirement and a second higher-security portion associated with the security requirement, the security requirement being higher than the lower security requirement;

split the data set into the first lower-security portion and the second higher-security portion;

add metadata to both the first lower-security portion and the second higher-security portion indicating that the first lower-security portion and the second higher-security portion are related;

identify a first data transceiver with a lower security metric that meets the lower security requirement, and a second data transceiver with the security metric that meets the security requirement; and transmit the first lower-security portion to the first data transceiver and the second higher-security portion to the second data transceiver.

15. The unified gateway of claim 14, wherein the receive port receives data using a first transmission protocol and the transmit port transmits data using a second transmission protocol.

16. The unified gateway of claim 14, wherein the machine executable code when executed further causes to:

wait for the target data transceiver to become available to transmit the data set, when the data set cannot be separated into the first lower-security portion and the second higher-security portion.

17. The unified gateway of claim 14, wherein the machine executable code when executed further causes to:

determine a set of attributes of the data set to identify the security requirement for transmitting the data set; and identify the plurality of valid data paths from the unified gateway to the target data transceiver, each valid data path including at least one of the plurality of data transceivers.

18. The unified gateway of claim 17, wherein the target data transceiver: receives the first lower-security portion from the first data transceiver, before receiving the second higher-security portion; utilizes the metadata to determine that the data set is incomplete; and caches the first lower-security portion of the data set.

* * * * *